(12) United States Patent
Cohen

(10) Patent No.: US 7,036,235 B1
(45) Date of Patent: May 2, 2006

(54) VERTICAL ALIGNMENT DEVICE

(76) Inventor: Lewis Cohen, 155 Waukena Ave., Oceanside, NY (US) 11572

( * ) Notice: Subject to any disclaimer, the term of this patent is extended or adjusted under 35 U.S.C. 154(b) by 0 days.

(21) Appl. No.: 10/909,776

(22) Filed: Aug. 2, 2004

(51) Int. Cl.
*G01C 15/10* (2006.01)
(52) U.S. Cl. .......................................... 33/392; 33/371
(58) Field of Classification Search .................. 33/194, 33/365, 370, 371, 373, 391, 392, 394, 368, 33/347, 413, 645; 16/221, DIG. 39
See application file for complete search history.

(56) References Cited

U.S. PATENT DOCUMENTS

| | | | |
|---|---|---|---|
| 630,262 A * | 8/1899 | Nacke | 33/350 |
| 1,109,008 A * | 9/1914 | Norton | 33/346 |
| 3,254,418 A | 6/1966 | Steckle | |
| 3,442,025 A | 5/1969 | Mathiesen | |
| 3,521,369 A | 7/1970 | Jones | |
| 3,638,325 A | 2/1972 | Petrik | |
| 3,977,088 A * | 8/1976 | Bondi | 33/334 |
| 4,442,610 A * | 4/1984 | Owens, Jr. | 33/392 |
| 5,077,906 A * | 1/1992 | Zaenkert | 33/392 |
| 5,426,860 A * | 6/1995 | Lee et al. | 33/392 |
| 5,481,809 A * | 1/1996 | Rooney | 33/392 |
| 6,021,578 A * | 2/2000 | DeVingo | 33/392 |
| 6,023,849 A * | 2/2000 | Montes | 33/392 |
| 6,594,912 B1* | 7/2003 | Ashjaee | 33/366.24 |

FOREIGN PATENT DOCUMENTS

GB    1455868 A  * 11/1976

* cited by examiner

*Primary Examiner*—R. Alexander Smith
(74) *Attorney, Agent, or Firm*—Michael I Kroll

(57) ABSTRACT

A vertical alignment device (10) between a downwardly extending upper spindle (12) on an upper mounting plate (14) of an upper pivot assembly (16) in a head jamb (18) and an upwardly extending lower spindle (20) on a lower mounting plate (22) of a lower pivot assembly (24) on a floor (26) for a glass door structure (28) comprising a body (30). A facility (32) is for attaching in a removable manner an upper portion (34) of the body (30) to the upper spindle (12). A plumb line (36) is provided with a plumb bob (38) affixed to a first end of the plumb line (36). An assembly (40) is for securing a second end of the plumb line (36) to a lower portion (42) of the body (30). The plumb bob (38) will hang down on the plumb line (36) to indicate an aligned location for the lower spindle (20) when the lower mounting plate (22) is bolted up on the floor (26), thereby allowing the glass door structure (28) to operate properly in a swinging manner.

16 Claims, 4 Drawing Sheets

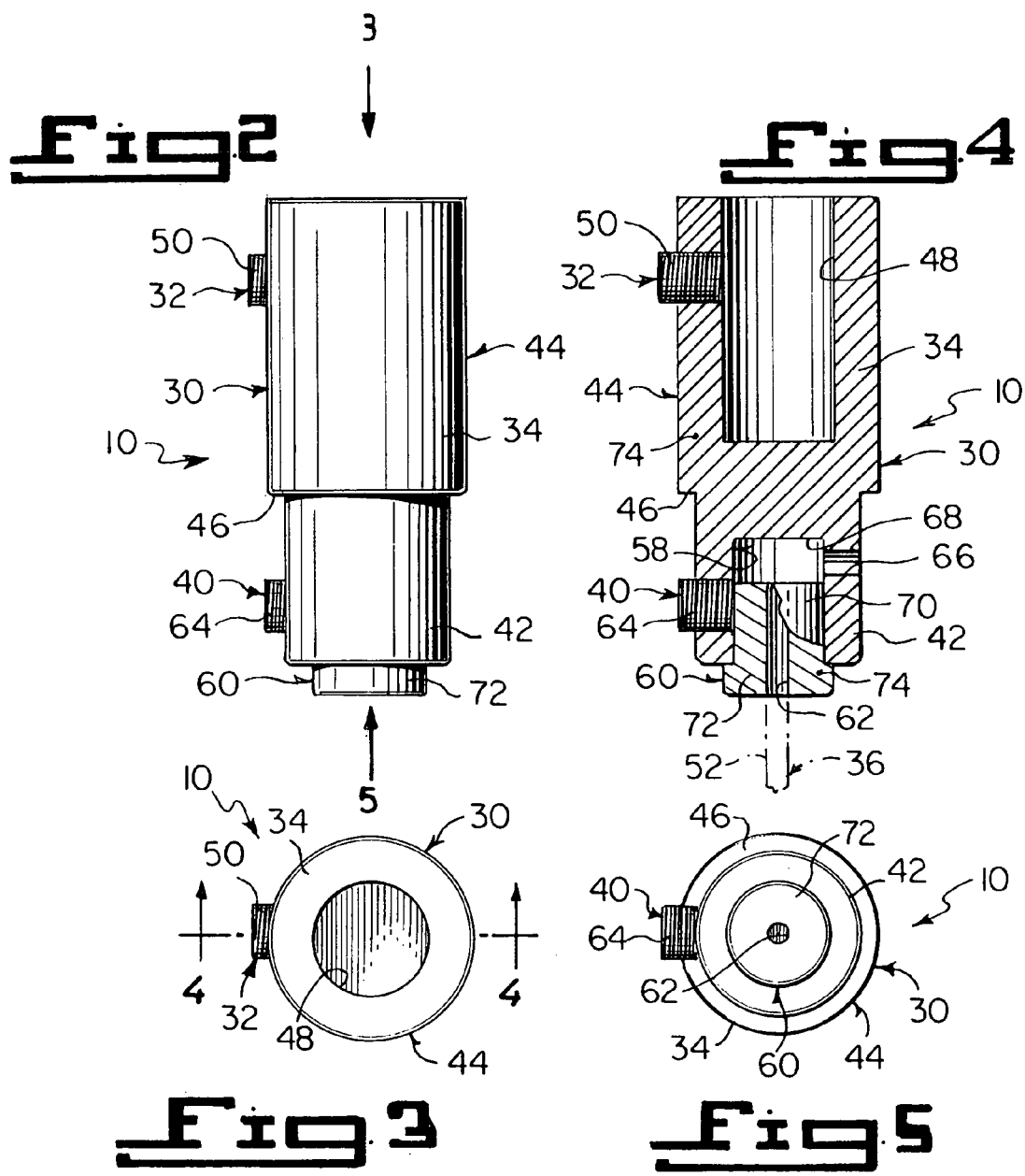

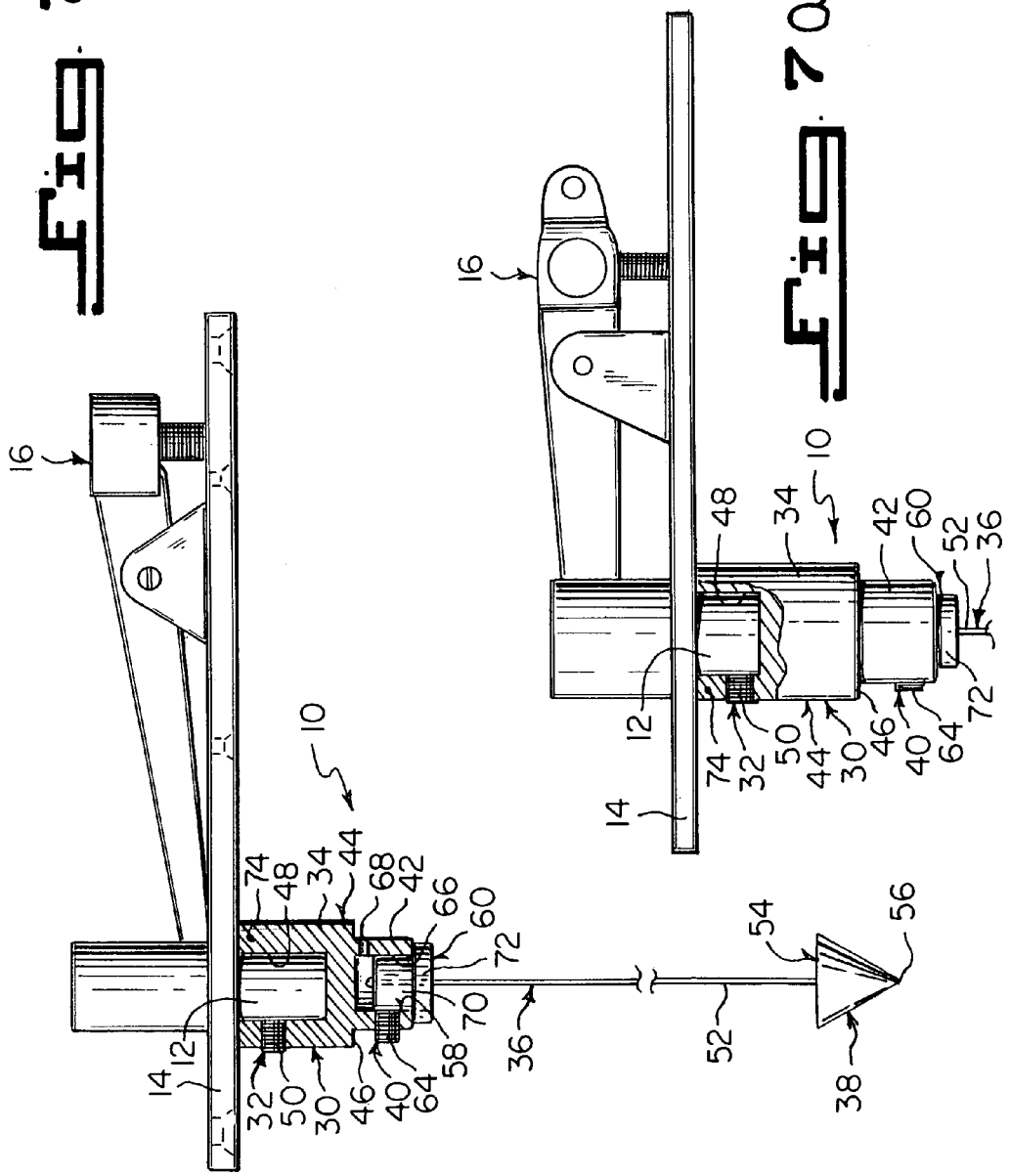

ly related to plumb bobs and
VERTICAL ALIGNMENT DEVICE

BACKGROUND OF THE INVENTION

1. Field of the Invention

The instant invention relates generally to plumb bobs and more specifically it relates to a vertical alignment device. The vertical alignment device attaches to an upper pivot assembly, to allow a plumb bob on a line to hang down to indicate the area where a lower pivot assembly must be set on a floor.

2. Description of the Prior Art

Numerous plumb bobs have been provided in prior art. For example, U.S. Pat. No. 3,254,418 to Steckle; U.S. Pat. No. 3,442,025 to Mathiesen; U.S. Pat. No. 3,521,369 to Jones and U.S. Pat. No. 3,638,325 to Petrik all are illustrative of such prior art. While these units may be suitable for the particular purpose to which they address, they would not be as suitable for the purposes of the present invention as heretofore described.

Steckle, Charles

Plumb-Bob Suspension

U.S. Pat. No. 3,254,418

Apparatus for suspending a plumb-bob from the top of a substantially vertical structure for determining the inclination thereof which comprises a way rigidly mounted on the top of the structure. A support is slideably fitted on the way. A bar is rigidly mounted on the support with a portion thereof projecting beyond one edge of the top. The projecting portion of the bar has at least one transverse opening therethrough for engaging a plumb-bob line.

Mathiesen, Arthur J.

Plumb Bob Device

U.S. Pat. No. 3,442,025

A unitary, self-storing plumb bob device including a housing, a spool within the housing having one end of a plumb line attached thereto, a plumb bob attached to the other end of the plumb line and receivable into the open end of the housing. A rewind handle, clutch, brake and resilient retention means in the housing are provided for release and retrieval of the plumb bob during use. The plumb bob device being adapted to mark the point from which a plumb line is drawn or to secure the device to this point.

Jones, Hicks

Universal Plumb Bob Level Device

U.S. Pat. No. 3,521,369

This universal plumb bob level device is housed in a transparent box from the top wall of which is pivotally suspended a pointed plumb bob registering with a cross line target on the bottom wall. One side wall has an extension engageable with a mounting block against which it is releasably pressed by a leaf spring projecting from the opposite side wall while the rear wall is held in face-to-face engagement with the front or abutment surface of the mounting block.

Petrik, Albert V.

Vertical Alignment Gauge

U.S. Pat. No. 3,638,325

A telescopically adjustable tubular construction for upright arrangement having a central opening in its upper end and permanent magnet means extending laterally from an upper region of the tubular construction for holding engagement with a doorjamb or the like. A standoff member is adjacent to a lower region of the tubular construction. A window is provided in a lower region of the tubular construction. A plumb bob means suspended interiorly of the tubular construction is visually accessible through the window.

SUMMARY OF THE INVENTION

A primary object of the present invention is to provide a vertical alignment device that will overcome the shortcomings of the prior art devices.

Another object is to provide a vertical alignment device that will attach in a removable manner to an upper pivot assembly of a glass door structure, so as to allow a plumb bob line to hang down over an area where a lower pivot assembly must be set.

An additional object is to provide a vertical alignment device that will save time and labor for installing and alignment the upper and lower pivot assemblies for the glass door structure to operate properly.

A further object is to provide a vertical alignment device that is simple and easy to use.

A still further object is to provide a vertical alignment device that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is an elevational view of the instant invention.

FIG. 3 is a top view taken in the direction of arrow 3 in FIG. 2.

FIG. 4 is a cross sectional view taken along line 4—4 in FIG. 3.

FIG. 5 is a bottom view taken in the direction of arrow 5 in FIG. 2.

FIG. 7 is an elevational view of the upper pivot assembly taken in the direction of arrow 7 in FIG. 6, with the body of the instant invention in cross section.

FIG. 7a is an elevational view similar to FIG. 7 of another type of an upper pivot assembly with the body of the instant invention broken away and attached to the upper spindle thereof.

Similar reference characters denote corresponding features consistently throughout the attached drawings.

DESCRIPTION OF THE PREFERRED EMBODIMENTS

Figure 1:
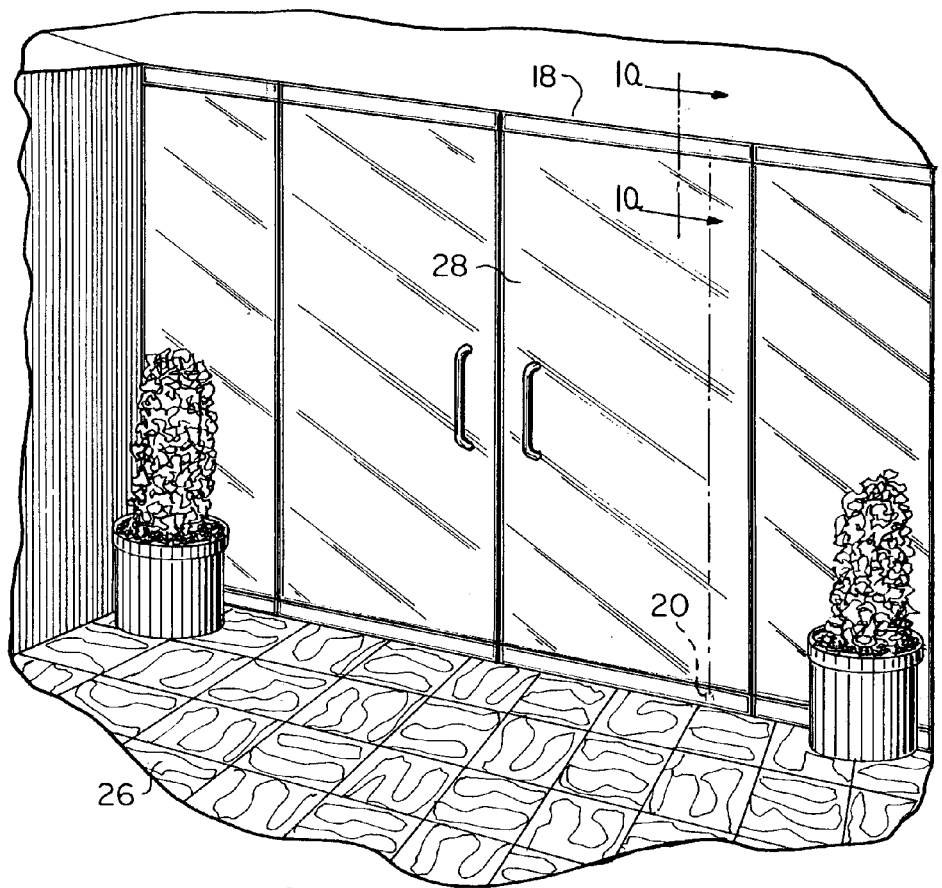
FIG. 1 is a perspective view of a glass door structure showing the alignment between the upper pivot assembly and the lower pivot assembly.

Turning now descriptively to the drawings, in which similar reference characters denote similar elements throughout the several views, FIGS. 2 to 7a illustrate a vertical alignment device 10 of the present invention. With regard to the reference numerals used, the following numbering is used throughout the various drawing figures.

10 vertical alignment device
12 upper spindle on 14
14 upper mounting plate of 16
16 upper pivot assembly
18 head jamb
20 lower spindle on 22
22 lower mounting plate of 24
24 lower pivot assembly
26 floor
28 glass door structure
30 body of 10
32 attaching facility of 10
34 upper portion of 30
36 plumb line of 10
38 plumb bob of 10
40 securing assembly of 10
42 lower portion of 30
44 generally cylindrical housing for 30
46 annular step on 44
48 aperture in 34 of 32
50 setscrew of 32
52 elongated wire cord for 36
54 conical weight for 38
56 plumb indicating pointer on 54
58 orifice in 42 of 40
60 bushing of 40
62 central opening in 60
64 setscrew of 40
66 air vent hole in 42
68 cylindrical bore for 58
70 cylindrical casing of 60
72 enlarged cylindrical head of 60
74 strong durable material for 30 and 60

Figure 1A:
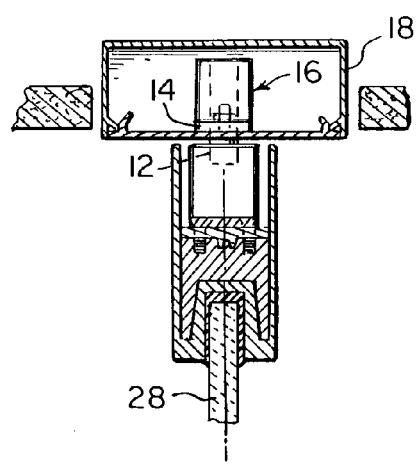
FIG. 1a is a cross sectional view taken along line 1a—1a in FIG. 1, showing the upper pivot assembly therein.
Figure 6:
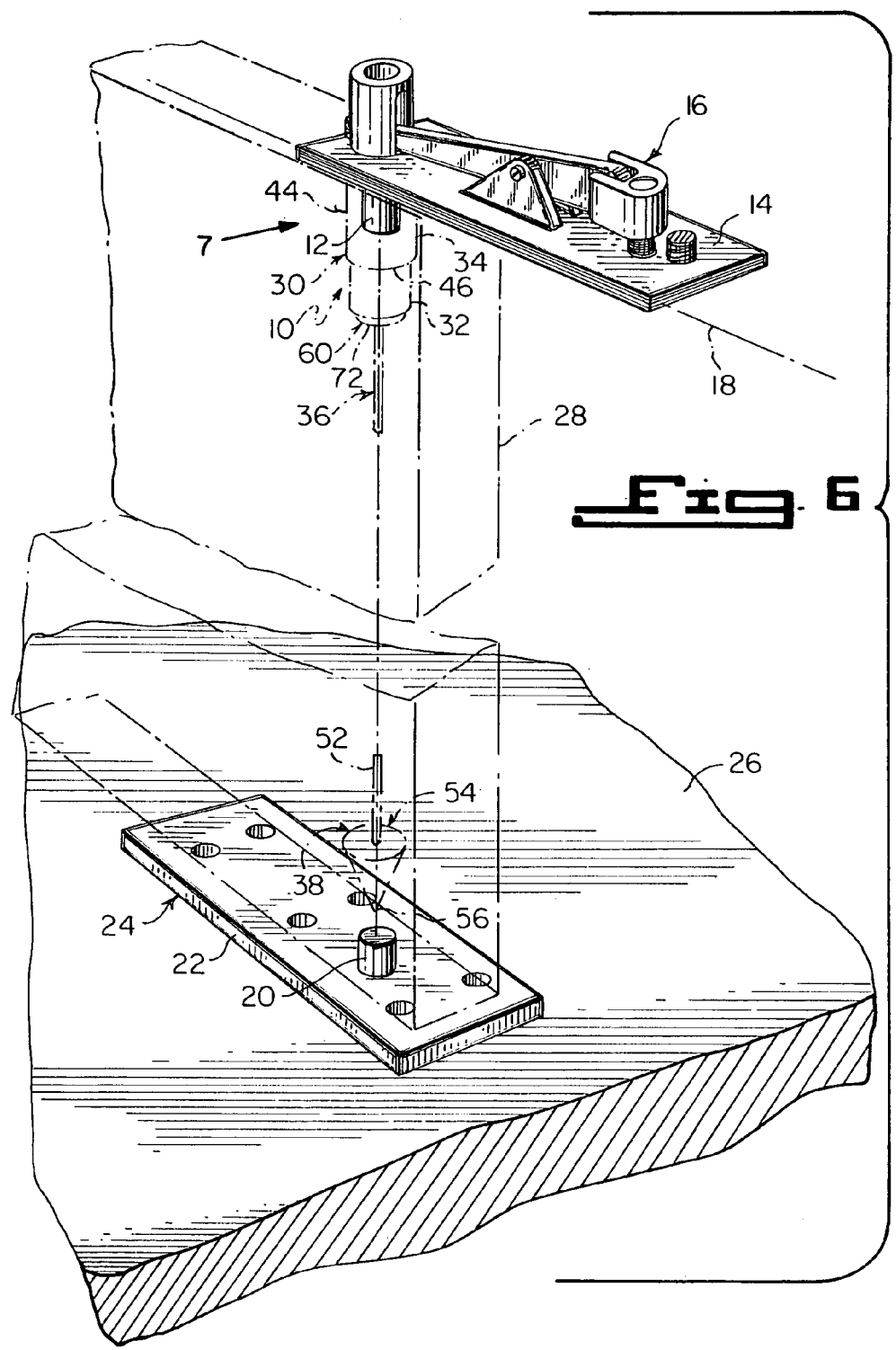
FIG. 6 is a perspective view of the glass door structure with parts broken away and in phantom, showing the spindle of the upper pivot assembly, aligning up the lower spindle of the lower pivot assembly.

The vertical alignment device 10 is for between a downwardly extending upper spindle 12 on an upper mounting plate 14 of an upper pivot assembly 16 in a head jamb 18 and an upwardly extending lower spindle 20 on a lower mounting plate 22 of a lower pivot assembly 24 on a floor 26 for a glass door structure 28, shown in FIG. 1 and 1a, and comprises a body 30. A facility 32 is for attaching in a removable manner an upper portion 34 of the body 30 to the upper spindle 12. A plumb liner 36 is provided with a plumb bob 38 affixed to a first end of the plumb line 36. An assembly 40 is for securing a second end of the plumb line 36 to a lower portion 42 of the body 30. The plumb bob 38 will hang down on the plumb line 36 to indicate an aligned location for the lower spindle 20, when the lower mounting plate 22 is bolted up on the floor 26, thereby allowing the glass door structure 28 to operate properly in a swinging manner.

The body 30 is a generally cylindrical housing 44, in which the upper portion 34 is slightly larger in diameter than the lower portion 42, so as to form an annular step 46 therebetween. The attaching facility 32 consists of the body 30 having an aperture 48 extending into the upper portion 34, so as to fit onto the upper spindle 12. A setscrew 50 is transversely threaded through the upper portion 34 of the body 30 and into the aperture 48. When the setscrew 50 is tightened, the upper portion 34 of the body 30 will be held in place on the upper spindle 12.

The plumb line 36 is an elongated wire cord 52. The plumb bob 38 is a conical weight 54, having a plumb indicating pointer 56 at a lower end thereof.

The securing assembly 40 includes the body 30 having an orifice 58 extending into the lower portion 42. A bushing 60 has a central opening 62 therethrough. The bushing 60 is sized to fit into the orifice 58 in the lower portion 42, wherein the second end of the plumb line 36 is attached to the bushing 60 through the central opening 62. A setscrew 64 is transversely threaded through the lower portion 42 of the body 30 and into the orifice 58. When the setscrew 64 is tightened, the bushing 60 will be held in place within the orifice 58. The lower portion 42 of the body 30 further has an air vent hole 68 transversely extending into the orifice 58, so as to allow easy insertion of the bushing 60 into the orifice 58.

The orifice 58 is a cylindrical bore 68. The bushing 60 includes a cylindrical casing 70 sized to fit into the cylindrical bore 68. The bushing 60 further includes an enlarged cylindrical head 72, which butts up against the lower portion 42 of the body 30 when the cylindrical casing 70 is inserted into the cylindrical bore 68. The body 30 and the bushing 60 are both fabricated out of a strong durable material 74.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A vertical alignment device between a downwardly extending upper spindle on an upper mounting plate of an upper pivot assembly in a head jamb and an upwardly extending lower spindle on a lower mounting plate of a lower pivot assembly on a floor for a glass door structure, comprising:

a) a body;
b) means for attaching in a removable manner an upper portion of said body to the upper spindle;
c) a plumb line;
d) a plumb bob affixed to a first end of said plumb line; and
e) means for securing a second end of said plumb line to a lower portion of said body, so that said plumb bob will hang down on said plumb line to indicate an aligned location for the lower spindle when the lower mounting plate is bolted up on the floor, thereby allowing the glass door structure to operate properly in a swinging manner, wherein said securing means includes:
 a) said body having an orifice extending into said lower portion;
 b) a bushing having a central opening there through, said bushing sized to fit into said orifice in said lower portion, wherein said second end of said plumb line is attached to said bushing through said central opening; and
 c) a setscrew transversely threaded through said lower portion of said body and into said orifice, so that when said setscrew is tightened, said bushing will be held in place within said orifice.

2. A vertical alignment device as recited in claim 1, wherein said body is a generally cylindrical housing in which said upper portion is slightly larger in diameter than said lower portion, so as to form an annular step therebetween.

3. A vertical alignment device as recited in claim 1, wherein said attaching means includes:
 a) said body having an aperture extending into said upper portion, so as to fit onto the upper spindle; and
 b) a setscrew transversely threaded through said upper portion of said body and into said aperture, so that when said setscrew is tightened said upper portion of said body will be held in place on the upper spindle.

4. A vertical alignment device as recited in claim 1, wherein said plumb line is an elongated wire cord.

5. A vertical alignment device as recited in claim 1, wherein said plumb bob is a conical weight having a plumb indicating pointer at a lower end thereof.

6. A vertical alignment device as recited in claim 1, wherein said lower portion of said body further having an air vent hole transversely extending into said orifice, so as to allow easy insertion of said bushing into said orifice.

7. A vertical alignment device as recited in claim 1, wherein said orifice is a cylindrical bore.

8. A vertical alignment device as recited in claim 7, wherein said bushing includes a cylindrical casing sized to fit into said cylindrical bore.

9. A vertical alignment device as recited in claim 8, wherein said bushing further includes an enlarged cylindrical head which butts up against said lower portion of said body when said cylindrical casing is inserted into said cylindrical bore.

10. A vertical alignment device as recited in claim 1, wherein said body and said bushing are both fabricated out of a strong durable material.

11. A vertical alignment device between a downwardly extending upper spindle on an upper mounting plate of an upper pivot assembly in a head jamb and an upwardly extending lower spindle on a lower mounting plate of a lower pivot assembly on a floor for a glass door structure, comprising:
 a) a body, wherein said body is a generally cylindrical housing in which an upper portion is slightly larger in diameter than a lower portion, so as to form an annular step there between;
 b) means for attaching in a removable manner the upper portion of said body to the upper spindle;
 c) a plumb line;
 d) a plumb bob affixed to a first end of said plumb line; and
 e) means for securing a second end of said plumb line to the lower portion of said body, so that said plumb bob will hang down on said plumb line to indicate an aligned location for the lower spindle when the lower mounting plate is bolted up on the floor, thereby allowing the glass door structure to operate properly in a swinging manner, wherein said plumb line is an elongated wire cord and said plumb bob is a conical weight having a plumb indicating pointer at a lower end thereof, said attaching means includes:
  i) said body having an aperture extending into said upper portion, so as to fit onto the upper spindle; and
  ii) a setscrew transversely threaded through said upper portion of said body and into said aperture, so that when said setscrew is tightened said upper portion of said body will be held in place on the upper spindle and said securing means includes
  i) said body having an orifice extending into said lower portion;
  ii) a bushing having a central opening there through, said bushing sized to fit into said orifice in said lower portion wherein said second end of said plumb line is attached to said bushing through said central opening; and
  iii) a setscrew transversely threaded through said lower portion of said body and into said orifice, so that when said setscrew is tightened said bushing will be held in place within said orifice.

12. A vertical alignment device as recited in claim 11, wherein said lower portion of said body further having an air vent hole transversely extending into said orifice, so as to allow easy insertion of said bushing into said orifice.

13. A vertical alignment device as recited in claim 12, wherein said orifice is a cylindrical bore.

14. A vertical alignment device as recited in claim 13, wherein said bushing includes a cylindrical casing sized to fit into said cylindrical bore.

15. A vertical alignment device as recited in claim 14, wherein said bushing further includes an enlarged cylindrical head which butts up against said lower portion of said body when said cylindrical casing is inserted into said cylindrical bore.

16. A vertical alignment device as recited in claim 15, wherein said body and said bushing are both fabricated out of a strong durable material.

\* \* \* \* \*